May 26, 1964 W. B. ELLWOOD 3,134,908

MAGNETICALLY CONTROLLED SWITCHING DEVICES
WITH NON-DESTRUCTIVE READOUT

Filed July 13, 1959

INVENTOR
W. B. ELLWOOD
BY Henry M. Bissell
ATTORNEY 3,134,908

MAGNETICALLY CONTROLLED SWITCHING DEVICES WITH NON-DESTRUCTIVE READOUT

Walter B. Ellwood, New York, N.Y., assignor to Bell Telephone Laboratories, Incorporated, New York, N.Y., a corporation of New York Filed July 13, 1959, Ser. No. 826,637
13 Claims. (Cl. 307—88)

This invention relates to electromechanical switching devices and more particularly to such a device employing a bistable remanent magnetic field to control the condition of the switch.

A switching device which uses a bistable remanent magnetic material such as a ferrite to provide control of a magnetically responsive mechanical switch by pulses which are shorter in duration than the response time of the switch is disclosed in application Serial No. 824,222 of A. Feiner et al. filed July 1, 1959, now Patent No. 2,995,637 issued August 8, 1961. In the disclosed device a bistable magnetic member is set in a particular remanent magnetization state by switching pulses of short duration. Thereafter the associated switch responds to the remanent magnetization state of the bistable member.

Normally the condition of its switch contacts may be relied upon as truly indicative of the state of a relay. With the arrangement of the cited Feiner et al. application, however, it is possible to reverse the remanent magnetization of the bistable member a number of times before the associated switch can change its condition. It is thus possible for the switch and the bistable magnetic member to be in non-corresponding states for a substantial interval, compared with operating time of eelctronic control circuitry. It is desirable that the remanent magnetization state of the device be ascertainable without having to wait until the switch changes to the corresponding condition. Furthermore, it is desirable that the remanent magnetization state of the device be ascertained without changing the magnetization state thereof.

In a mutipath switching network, such as is common in a telephone communication system, it is desirable that the elements comprising the links of the network be situated in a compact array. This is particularly the case where the elements are arrayed in a matrix and are designed to be selected by coincident signaling techniques. It is, therefore, essential that the magnetic fields generated within a particular device of such an arrangement be confined therein and not permitted to affect similar devices which may be situated in close proximity thereto.

It is an object of this invention to provide an improved electromechanical switching device of the type described above.

More specifically it is an object of this invention to provide for the determination of the magnetization state of such a device without changing that state.

A further object of one specific embodiment of this invention is to provide a structure for such a device which eliminates stray magnetic fields outside the device.

One specific embodiment of this invention utilizes a magnetic member in conjunction with a pair of magnetically responsive reed switches of the type disclosed in "Development of Reed Switches and Relays" by O. M. Hovgaard et al., Vol. 34, Bell System Technical Journal, page 309 *ff*. The magnetic member comprises two separate rods of a material exhibiting a plurality of remanent magnetization states, such as a ferrite, and further has a pair of offset sections connecting the ends of the rods with the reed switch terminals. Coincident current pulses applied to windings positioned on the rods of the member determine the particular magnetization state in each of the rods. Depending on the current magnetization state in each rod, magnetic flux from these rods is directed through the switches to close the switch contacts or else it circulates entirely within the member, bypassing the switches so as to permit the switch contacts to release.

Additional conductors are inductively coupled with the offset sections of the magnetic member. The degree of inductive coupling between these additional conductors, and also with the other windings, depends upon the flux density in the offset sections. When flux is driven through the offset sections of the magnetic member, corresponding to the operated condition of the relay, the net flux linkages between these additional conductors increases because of the nonlinear combination of the separate magnetic fields. On the other hand, when the remnanent magnetization flux bypasses the offset sections, as it does in the released condition of the relay, the net flux linkage between these additional conductors is zero. Thus the magnetization state of the relay can be ascertained without affecting this state by applying an alternating signal on one of these last-mentioned conductors and detecting the induced signal on the other such conductor to measure the inductive coupling between the two.

A second specific embodiment of this invention utilizes a pair of ferrite blocks on opposite sides of a pair of adjacent magnetically responsive reed switches so as to effectively enclose the switches and minimize stray magnetic flux. This result is enhanced by the provision of operate windings about the switches themselves rather than about the ferrite blocks. Release windings are arranged to enclose portions of the ferrite blocks so that a remanent magnetization is induced therein which is at right angles to the magnetization existing when the switches are operated. In accordance with the invention a third pair of windings are individually provided about the respective ferrite blocks for non-destructive readout of the magnetic flux condition of the relay. Because of the way this specific embodiment of the invention provides for the control of the switch contacts described in detail below, the degree of coupling existing between the release windings and the readout windings is dependent upon the remanent magnetization states of the ferrite blocks. Accordingly, a small alternating current signal applied to one of the release windings produces signals on the readout windings which are indicative of the magnetic condition of the device. In accordance with the invention, this indication is provided without changing the magnetic state of the device.

It is a feature of this invention that an inductive coupling be provided between a pair of windings on a magnetic member included in combination with an electromechanical relay such that the degree of coupling depends upon the magnetization state of the member.

It is a feature of one specific embodiment of this invention that the remanent magnetic member also define a magnetic shield for the electromechanical relay.

A complete understanding of this invention and of these and various other features thereof may be gained from the following detailed description and the accompanying drawing, in which.

Figure 1:
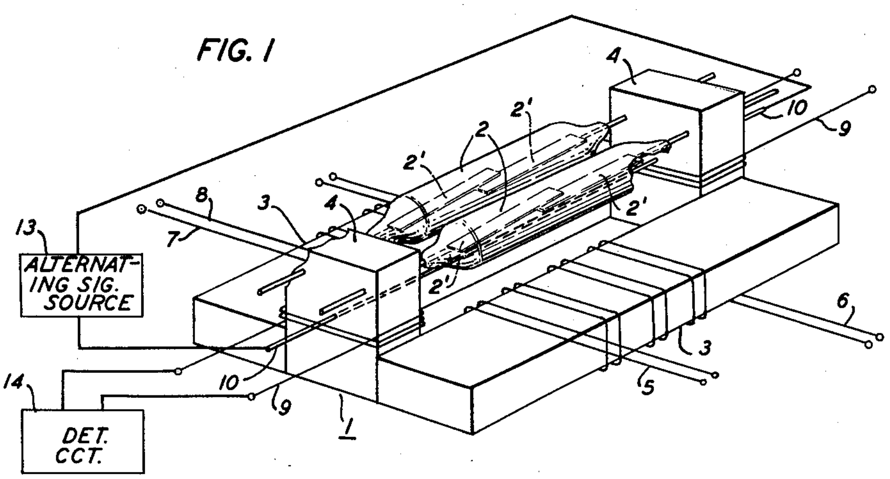
FIG. 1 depicts one specific embodiment of the invention.

In FIG. 1 a bistable magnetic member 1 is depicted in combination with a pair of magnetically responsive reed switches 2. As mentioned hereinbefore, each of the switches 2 comprises a pair of electrical contacting members 2' which may advantageously be glass or otherwise encapsulated and are of a character such as described in detail in the article by O. M. Hovgaard et al. referred to. The members 2' are of an electrically conductive magnetic material and are removably suspended at one end with the other ends overlapping to provide for electrical continuity therethrough when the overlapping ends are brought into contact. The member 1 comprises a pair of rods 3 which are connected to each other and to the switches 2 by two elements 4 at opposite ends of the rods 3. These rods are of a material exhibiting a plurality of stable remanent magnetization states, such as a magnetically hard ferrite, while the elements 4 comprise a magnetic material exhibiting a high permeability so as to provide low reluctance paths for magnetic flux. It will be noted that the elements 4 include offset sections in which the switches 2 are mounted outside the plane of the rods 3. Inductively coupling these offset sections of the elements 4 are a pair of windings 9, individually wound thereon, and a single conductor 10, inserted through the elements 4. Suitable insulation, not shown, is provided to isolate electrically the respective conductors and the switch terminals from each other.

Figure 2A:
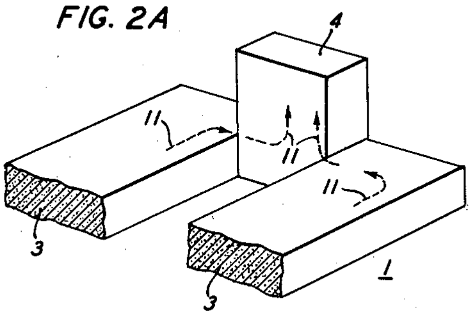
FIGS. 2A and 2B represent a portion of the embodiment of FIG. 1 corresponding to different flux conditions of the device.
Figure 2B:
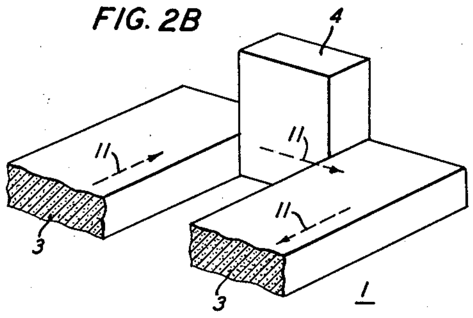

In FIGS. 2A and 2B a section of the bistable magnetic member 1 of FIG. 1 is shown to illustrate the two distinct magnetization conditions thereof. Portions of the rods 3 are shown together with one of the elements 4. The arrows 11 indicate the direction of magnetic flux within the depicted portion of the member 1.

It will be noted in FIG. 2A that the magnetic flux is directed through the offset section of the element 4 when similarly directed magnetization states exist in the two rods 3. Conversely, when the magnetization states of the individual rods 3 are such that the flux is directed in opposite directions therein, as in FIG. 2B, the magnetic flux is caused to circulate directly through the element 4 without passing through the offset section thereof.

In the operation of the specific embodiment of the invention depicted in FIG. 1, pulses are applied selectively to control windings 5, 6, 7, and 8, pairs of windings being placed on each leg for coincident current operation of the device. To change the condition of the relay it is only necessary to apply signals to the two windings on any one leg so that the combined magnetmotive force developed by the control signals is sufficient to reverse the magnetization state of that leg. The device is thereby changed from one to the other of the two magnetization conditions depicted in FIGS. 2A and 2B and the condition of the electrical contacting members 2' of the switches 2 thereafter changes in response to the newly established flux condition. The same result may be effected by developing the requisite magnetizing force by applying a double magnitude pulse to a single winding 5, 6, 7 or 8.

In accordance with an aspect of this invention, an indication of the magnetic state of the specific embodiment depicted in FIG. 1 is provided independently of the state of the switches 2. When the device of FIG. 1 is in a magnetization condition corresponding to that depicted in FIG. 2B, a small alternating signal applied from a source 13 to the conductor 10 develops no net flux linking the windings 9 because the material of the offset sections of the elements 4 is driven along a linear portion of its magnetization curve. Thus the lack of a signal on the windings 9 during interrogation indicates that the magnetic member 1 is in a magnetization condition to release the switches 2. When the magnetization condition of FIG. 2A exists, however, the material of the offset portions of the elements 4 is substantially saturated with magnetic flux. Accordingly the circular magnetic field developed by a small alternating signal on the conductor 10 combines nonlinearly and vectorially with the remanent magnetization field from the rods 3 to modulate the flux linking the windings 9, thereby inducing a signal on these windings which is detected by a detector circuit 14 and which indicates that the magnetic member 1 is in a magnetization condition to operate the switches 2.

While a winding 9 has been depicted on each offset section 4, only one need be utilized as shown, as the magnetic conditions in both sections 4 are identical. However, advantageously the two windings 9 may be connected in series to compensate for possible errors due to extraneous ambient fields. Further it should be noted that the application of alternating signals to the conductor 10 in the interrogation process has a negligible effect upon the individual remanent magnetization states of the rods 3. Thus, in accordance with the invention, determination of the magnetic flux condition of the member 1 is achieved without affecting the magnetic state, thereby providing non-destructive readout of the device.

I have found that an alternative method which depends upon the effect of a saturable reactance is available for ascertaining the magnetic state of the device of FIG. 1 without affecting that state. When the offset sections of the elements 4 are substantially saturated with magnetic flux, as depicted in FIG. 2A, the inductive reactance of the winding 9 is considerably less than when the magnetic flux bypasses these offset sections, as it does for the opposite magnetic condition depicted in FIG. 2B. Thus the windings 9 may be connected to a suitable reactance measuring device, known to the art, to provide the desired non-destructive indication of the magnetic state of the device.

Figure 3:
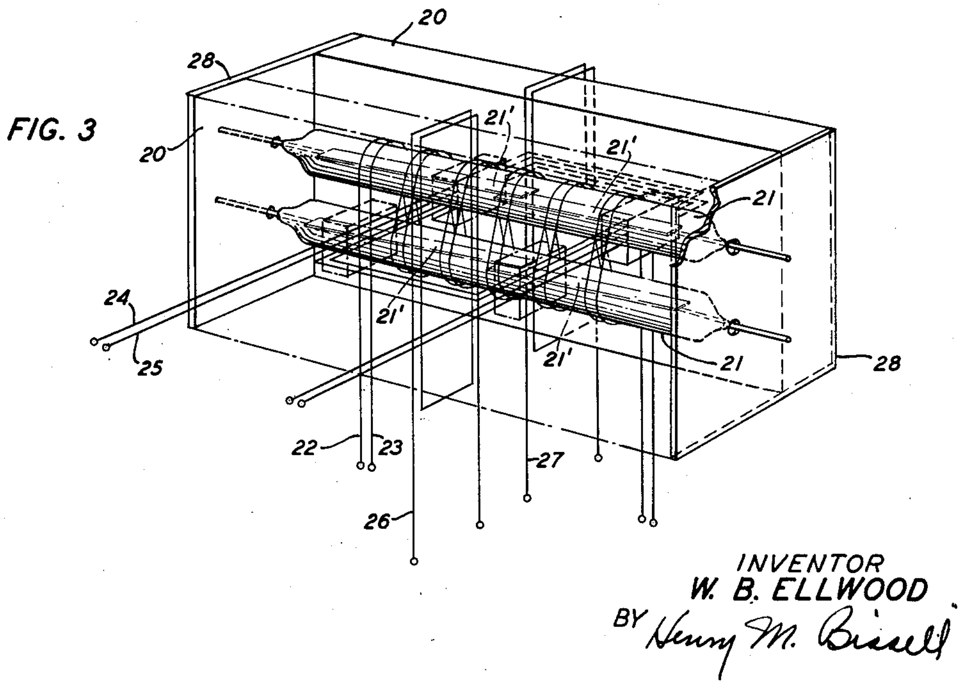
FIG. 3 depicts a second specific embodiment of the invention.

In FIG. 3 a second specific embodiment of the invention, also providing non-destructive readout, is depicted. In FIG. 3 a pair of blocks 20, which advantageously may be of a ferrite material, are shown on opposite sides of a pair of reed switches 21. The switches 21 are also similar to those described in the aforementioned Hovgaard et al. article and each also comprises a pair of encapsulated electrical contacting members 21' of an electrically conductive magnetic material. The nearer block 20 is shown in phantom view so that the details of the enclosed portion of the embodiment may be shown more clearly. The reed switches 21 have a pair of windings 22 and 23 wound thereon. A second pair of windings 24 and 25 are wound through apertures in the blocks 20 and between the switches 21 so that the plane of these windings is perpendicular to the plane of the windings 22 and 23. A third pair of windings 26 and 27 are individually wound about the respective ferrite blocks 20. Completing the magnetic circuit for the blocks 20 and the switches 21 are a pair of magnetically permeable end pieces 28 which also serve to position the switches 21.

The switches 21 advantageously are operated on a coincident current basis by applying signals to the windings 22 and 23. The flux produced by these windings passes longitudinally through the switches 21 and back through the ferrite blocks 20, establishing a particular magnetization state in the blocks 20. This magnetization state maintains a magnetic flux through the switches 21 after the pulses on the windings 22 and 23 are terminated, thus causing the switches 21 to operate in their normal response time during a succeeding time interval.

To open the contacting members 21' of the switches 21, coincident current pulses are applied on the windings 24 and 25 producing a remanent magnetization state which is transverse to that previously selected by currents in the windings 22 and 23. In this transverse magnetization condition the flux is substantially contained within the blocks 20, encircling the respective apertures therein. Little or no flux is directed through the switches 21, thus permitting them to release under the influence of their resilient suspension members.

It will be noted that the blocks 20 extend beyond the switches 21, partially enclosing them. When the longitudinal magnetization condition is established in the blocks 20, magnetic flux travels through them, across the end pieces 28, and through the switches 21. When the transverse magnetization condition is established in the blocks 20, substantially all of the magnetic flux is contained therein as described above. In either case, it is clear that the magnetic flux pertaining to a particular device is essentially confined thereto by the shielding effect of the structure provided in this specific embodiment of the invention as enhanced by the flux pattern for one particular state of the device. If desired, the effectiveness of the magnetic shielding may be increased by providing appropriate cavities in the blocks 20 to enclose the switches 21 more completely.

In accordance with the invention, non-destructive readout of the flux condition of the specific embodiment thereof depicted in FIG. 3 is provided. To ascertain the remanent magnetization states of the blocks 20 an alternating current signal is applied to one of the windings 24 and 25. This interrogation signal is of insufficient magnitude to affect the remanent magnetization states of the blocks 20. However, it develops a slight fluctuating magnetic field within the blocks in a transverse direction. Should the established magnetization state of the blocks 20 also be in the transverse direction, none of the flux resulting either from the remanent magnetization condition of the blocks or the fluctuating field developed by the alternating current interrogation signal links the windings 26 and 27 because the flux is completely contained in circulating paths within the individual blocks. Thus no inductive coupling is provided between the interrogated winding 24 or 25 and the readout windings 26 and 27. Accordingly for the transverse magnetization state, corresponding to the released condition of the relay, no signal is produced on the windings 26 and 27 in response to an alternating interrogation signal on one of the windings 24 and 25.

On the other hand, should the longitudinal magnetization condition be established in the blocks 20, the slight fluctuating magnetic field developed by the alternating current interrogation signal produces a modulation of the longitudinal magnetic flux because of the nonlinear relationship of the flux density to the magnetizing force in the material. Since the resultant modulated flux links the windings 26 and 27, an alternating current signal is induced therein indicating the existence of the longitudinal magnetization condition which corresponds to the operated state of the device. In this fashion, the existing magnetization states of the ferrite blocks may be ascertained without requiring their reversal and without having to rely upon the contact state of the switches 21 to provide the desired information.

It is to be understood that the above-described arrangements are illustrative of the principles of the invention. Numerous other arrangements may be devised by those skilled in the art without departing from the spirit and scope of the invention.

What is claimed is:

1. In combination, a switch having electrical contacting members operable by magnetic flux therethrough, a magnetic member of a material exhibiting a plurality of stable remanent magnetization states and defining a first closed flux loop, means for completing a second closed flux loop through said contacting members and said magnetic member, means for producing magnetic flux through said contacting members including first energizing means for establishing a particular magnetization state in said magnetic member in said second flux loop, means for eliminating said magnetic flux through said contacting members including second energizing means for establishing a different magnetization state in said magnetic member in said first flux loop, and means for ascertaining the magnetization state of said magnetic member without changing said state including current conductive means inductively coupled to said magnetic member and said second closed flux loop, and detecting winding means inductively coupled to said second closed flux loop.

2. The combination of claim 1 wherein said magnetic member comprises a pair of blocks positioned on opposite sides of said switch and included in said first flux loop to provide a magnetic shield for said switch.

3. The combination of claim 2 wherein said first energizing means comprises a first conductive winding about said switch.

4. The combination of claim 3 wherein said second energizing means comprises a second conductive winding enclosing portions of both of said blocks with the axis of said second winding perpendicular to the axis of said first winding.

5. The combination of claim 1 wherein said magnetic member comprises a pair of ferrite rods positioned in a common plane and a pair of magnetically permeable elements joining said rods to said contacting members of said switch, each of said elements having an offset portion for mounting said switch outside the plane of said rods and wherein said detecting winding means comprises a winding about one of said offset portions and said current conductive means comprises a conductor threaded through said one offset portion.

6. An electrical switching device comprising a bistable magnetic member, a switch having a pair of flux responsive contacting elements, magnetic connecting means for connecting said elements to said member and completing a closed flux loop, means for inducing a magnetic flux in said magnetic member and flux loop for operating said contacting elements, means for diverting said magnetic flux from said magnetic connecting means and said contacting elements, and means for ascertaining the operative state of said switching device comprising a conductor passing through said magnetic connecting means, means for applying a signal to said conductor to cause a change in flux in said connecting means when said last-mentioned means has a magnetic flux induced therein, and detecting winding means coupled to said connecting means for detecting flux changes therein.

7. An electrical switching device comprising a magnetic structure having a pair of legs and defining a first closed flux loop, at least one of said legs being of a material having substantially rectangular hysteresis characteristics, a switch having a pair of magnetic flux responsive electrical contacting members, magnetic connecting means for connecting said contacting members to said magnetic structure to define a second closed flux loop including said one of said legs, energizing means for inducing a magnetic flux in said second flux loop and for diverting magnetic flux from said connecting means and said contacting members for controlling the operation of said contacting members, and means for sensing the magnetic state of said one of said legs comprising interrogating means for applying a varying magnetic field to said magnetic structure in said second flux loop, and a sensing winding coupled to said second flux loop for detecting flux changes caused by said varying magnetic field.

8. An electrical switching device as claimed in claim 7 in which said interrogating means comprises conducting means passing through an aperture in said magnetic connecting means and means for applying periodic signals to said conducting means, and in which said sensing winding is coupled to said magnetic connecting means at a point outside of the direct influence of said varying magnetic field.

9. An electrical switching device as claimed in claim 7 in which said interrogating means comprises conducting means passing through an aperture in said one of said legs and means for applying periodic signals to said conducting means, and in which said sensing winding is coupled to said one of said legs at a point outside of the direct influence of said varying magnetic field.

10. An electrical switching device as claimed in claim 8 also comprising a second switch also having a pair of magnetic flux responsive electrical contacting members, said magnetic connecting means also connecting said last-mentioned contacting members to said magnetic structure to define a third closed flux loop including the other of said pair of legs, said energizing means also including means for inducing a magnetic flux in said third closed flux loop, and means for switching the magnetic flux in one of said pair of legs for diverting said magnetic flux from said connecting means and said contacting members of both of said switches to said first flux loop for controlling the operation of said last-mentioned contacting members.

11. An electrical switching device comprising a magnetically responsive switch, a magnetic member of a material exhibiting a plurality of stable remanent magnetization states, magnetic means connecting said switch to said member, said last-mentioned means completing a flux path between said switch and said magnetic member, means for inducing a magnetic flux in said member for operating said switch, means for diverting magnetic flux from said magnetic means and said switch, and detecting means for ascertaining the magnetic state of said magnetic means.

12. An electrical switching device in accordance with claim 11 wherein said last-mentioned means comprises interrogating means for applying a fluctuating magnetic field to said magnetic means.

13. An electrical switching device in accordance with claim 12 wherein said interrogating means comprises a conductor threading said magnetic means and said detecting means further comprises a conductive winding about said magnetic means.

References Cited in the file of this patent

UNITED STATES PATENTS

| | | |
|---|---|---|
| 2,264,022 | Ellwood | Nov. 25, 1941 |
| 2,918,661 | Chen | Dec. 22, 1959 |
| 2,918,663 | Chen | Dec. 22, 1959 |
| 2,923,923 | Raker | Feb. 2, 1960 |
| 2,926,339 | Kramer | Feb. 23, 1960 |